US011661916B1

(12) United States Patent
Padula et al.

(10) Patent No.: US 11,661,916 B1
(45) Date of Patent: May 30, 2023

(54) WAVE ENERGY HARNESSING DEVICES (71) Applicant: LDI Consulting Inc., Farmington Hills, MI (US)

(72) Inventors: Filippo D. Padula, Milford, MI (US); Michael A. Schwartz, Northville, MI (US); Hugo Freitas Pimentel, Farmington Hills, MI (US)

(73) Assignee: LDI CONSULTING INC., Farmington Hills, MI (US)

( * ) Notice: Subject to any disclaimer, the term of this patent is extended or adjusted under 35 U.S.C. 154(b) by 0 days.

(21) Appl. No.: 17/572,200

(22) Filed: Jan. 10, 2022

(51) Int. Cl.
*F03B 13/12* (2006.01)
*F03B 13/22* (2006.01)

(52) U.S. Cl.
CPC .................................. *F03B 13/22* (2013.01)

(58) Field of Classification Search
CPC ........ F03B 13/26; F03B 13/16; F03B 13/188; F03B 13/1885; F03B 13/20; F03B 15/00; F05B 2240/93; F05B 2260/4031; F05B 2220/706; F05B 2240/97; F05B 2280/5001; Y02E 10/38
See application file for complete search history.

(56) References Cited

U.S. PATENT DOCUMENTS

| 6,247,308 B1 * | 6/2001 | Solell | F03B 13/1815 |
| | | | 74/125.5 |
| 7,768,143 B2 * | 8/2010 | McCague | F03B 13/186 |
| | | | 290/53 |
| 2009/0066085 A1 * | 3/2009 | Gray | F03B 13/20 |
| | | | 340/984 |
| 2010/0043425 A1 * | 2/2010 | Dragic | F03B 13/1855 |
| | | | 60/504 |
| 2011/0031750 A1 * | 2/2011 | Kreissig | F03B 13/1885 |
| | | | 290/53 |
| 2015/0275847 A1 * | 10/2015 | Sung | F16H 33/00 |
| | | | 74/37 |
| 2019/0024622 A1 * | 1/2019 | Sung | F16H 55/36 |

FOREIGN PATENT DOCUMENTS

| CN | 210118225 U | 2/2020 |
| CN | 110594083 B | 11/2020 |
| EP | 2370690 B1 | 8/2019 |
| KR | 20060130875 A | 12/2006 |
| KR | 101656995 B1 | 9/2016 |
| KR | 101751218 B1 | 6/2017 |

\* cited by examiner

*Primary Examiner* — Shafiq Mian
(74) *Attorney, Agent, or Firm* — Dinsmore & Shohl LLP (57) ABSTRACT

Disclosed herein are wave energy harnessing devices including a first movable device configured to translate in response to a level change in a water body, a first float gear configured to rotate in in response to translation of the first movable device, a first input shaft rotatably driven by the first float gear in response to rotation of the first float gear, an output shaft restricted to rotation in a first direction, and a pair of one-way clutches coupled to the first input shaft and the output shaft and configured to operatively couple the first input shaft to the output shaft in response to rotation of the first input shaft either in the first direction or in a second direction.

20 Claims, 10 Drawing Sheets

WAVE ENERGY HARNESSING DEVICES

TECHNICAL FIELD

The present specification generally relates to apparatus and methods for harnessing wave energy and, more specifically, apparatus and methods for generating energy in response to bidirectional movement of a wave.

BACKGROUND

There has been a trend to harness energy from previously unharnessed or marginally unharnessed sources of energy. The trend is even more prevalent in harnessing natural energy that is environmentally friendly.

One source of previously harnessed energy that is also environmentally friendly is the energy generated from the movement of water levels in water bodies. Conventional systems for harnessing energy from changes in water level caused by waves tend to be costly to construct and maintain. Further, these systems tend to have limited energy harnessing capabilities by utilizing only a single output source and/or generating energy during a change in water level in a single direction, such as an increase in water level or a decrease in water level. Accordingly, a need exists for improved apparatus and methods that increase the efficiency of harnessing wave energy.

SUMMARY

In one embodiment, a wave energy harnessing device includes: a first movable device configured to translate in response to a level change in a water body; a first float gear configured to rotate in in response to translation of the first movable device; a first input shaft rotatably driven by the first float gear in response to rotation of the first float gear; an output shaft restricted to rotation in a first direction; and a pair of one-way clutches coupled to the first input shaft and the output shaft and configured to operatively couple the first input shaft to the output shaft in response to rotation of the first input shaft either in the first direction or in a second direction.

In another embodiment, a wave energy harnessing device includes: a pair of gear assemblies, each including: a movable device configured to translate in either a first direction or a second direction in response to a water level change of a water body; a float gear rotatably coupled to the movable device and configured to rotate in response to translation of the movable device; an input shaft rotatably driven by the float gear in response to rotation of the float gear; a first one-way clutch disposed within a first one-way gear rotatably coupled to the float gear and restricted to rotate in the first direction; and a second one-way clutch disposed within a second one-way gear rotatably coupled to the float gear and restricted to rotate in the second direction; and an output shaft restricted to rotate in the first direction, the output shaft operatively coupled to the input shaft by the first one-way clutch in response to rotation of the float gear in the first direction and operatively coupled to the input shaft by the second one-way clutch in response to rotation of the float gear in the second direction, wherein translation of the movable device in either of the pair of gear assemblies in either the first direction or the second direction results in rotation of the output shaft in the first direction.

In yet another embodiment, a method of harnessing wave energy in a water body includes: translating a first movable device in either a first direction or a second direction in response to a water level change; rotating a first gear in response to translation of the first movable device, rotating a first input shaft in response to rotation of the first gear; operatively coupling the first input shaft to an output shaft by a first one-way clutch in response to rotation of the first input shaft; translating a second movable device in either the first direction or the second direction in response to the water level change; rotating a second gear in response to translation of the second movable device; rotating a second input shaft in response to rotation of the second gear; and operatively coupling the second input shaft to the output shaft by a second one-way clutch in response to rotation of the output shaft, wherein translation of the first movable device and the second movable device in either the first direction or the second direction results in rotation of the output shaft restricted to the first direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to a wave energy harnessing device that includes multiple gear assemblies, each generating energy during both an increase and a decrease in a water level to increase the efficiency of harnessing wave energy.

The wave energy harnessing device includes a housing, a gear assembly, and a float. The wave energy harnessing device is capable of harnessing energy through multiple mechanisms so that it may increase the efficiency of harnessing energy. Various embodiments of the method and apparatus and the operation of the method and apparatus are described in more detail herein. Whenever possible, the same reference numerals will be used throughout the drawings to refer to the same or like parts.

Figure 1:
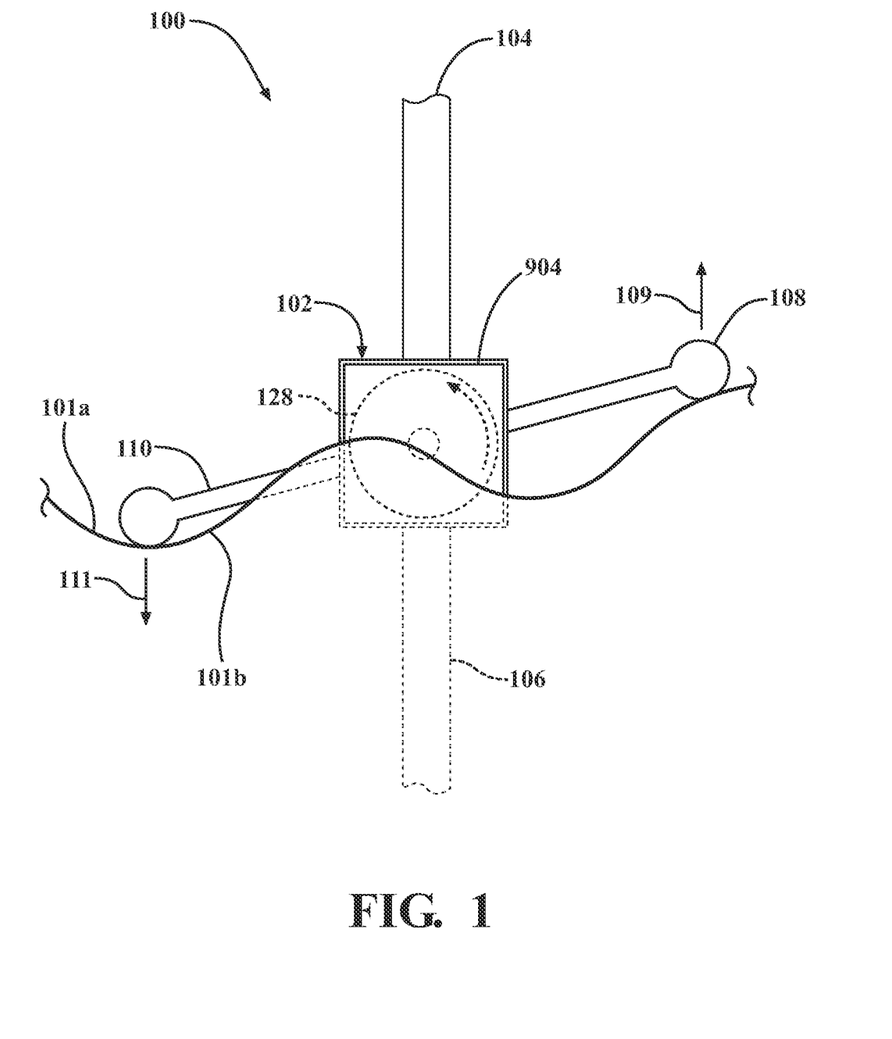
FIG. 1 schematically depicts an environmental view of a wave energy harnessing device positioned in a water body and mounted to a support, according to one or more embodiments shown and described herein.

Referring now to FIG. 1, an environmental view of a wave energy harnessing device 100 is illustrated according to one or more embodiments described herein. The wave energy harnessing device 100 may be positioned at a water surface 101a of a water body 101b, beneath the water surface 101a, above the water surface 101a, or away from the water surface 101a. The wave energy harnessing device 100 is configured such that it harnesses changes in a water level of the water surface 101a, i.e., a change in height of the water surface 101a, to generate energy. The energy may be converted into mechanical energy, electrical energy, and/or thermal energy. In embodiments, the energy harnessed by the wave energy harnessing device 100 stores the energy in an energy storing mechanism (e.g., a battery, a spring, and the like), and/or actively drives a system (e.g., a mechanical transmission).

The wave energy harnessing device 100 includes a housing 102 such as, for example, a casing, an enclosure, and the like. The housing 102 may be positioned at the water surface 101a of the water body 101b, beneath the water surface 101a, above the water surface 101a, or away from the water surface 101a. In embodiments, the wave energy harnessing device 100 includes a top post 104 (e.g., a supporting structure, a fixture, and the like) and/or a bottom post 106 (e.g., a supporting structure, a base, a fixture, and the like). The housing 102 is positioned between the top post 104 and the bottom post 106 such that the housing 102 may be maintained at a fixed position relative to the water body 101b. Particularly, the top post 104 and/or the bottom post 106 may be secured onto a fixed structure (e.g., a deck, an oil platform, and the like) or a water vehicle (e.g., a boat) to maintain the position of the housing 102. In other embodiments, the housing 102 may be secured to the fixed structure without the use of the top post 104 and/or the bottom post 106. In other embodiments, the housing 102 is configured to float on the water surface 101a and may be coupled to a structure through some fastening mechanism. (e.g., cables, wires, and the like).

The wave energy harnessing device 100 further includes a first movable device such as a first handle 108 (e.g., a float, a raft, a buoy, a balloon, and the like). The first handle 108 is rotatably coupled to the housing 102 and is configured to extend from the housing 102. In embodiments, the first handle 108 is configured to float on the water surface 101a. In embodiments, the first handle 108 is configured such that an end of the first handle 108 floats on the water surface 101a. In embodiments, the first handle 108 is configured to translate relative to the housing 102 in response to a change in the water level. In other words, an increase in the height of the water surface 101a applies a force onto the first handle 108 in the direction of arrow 109. Alternatively, a decrease in the height of the water surface 101a permits the first handle 108 to move in a direction opposite the direction of arrow 109. This force causes the first handle 108 to move relative to the housing 102. In embodiments, the first handle 108 moves vertically relative to the housing 102 (e.g., parallel to the direction of gravity). In other embodiments, the first handle 108 may move tangentially relative to the housing 102. As discussed in greater detail herein, the translation of the first handle 108 operationally drives a gear assembly positioned in the housing 102, as discussed in more detail herein.

The wave energy harnessing device 100 further includes a second movable device such as a second handle 110 (e.g., a float, a raft, a buoy, a balloon, and the like). The second handle 110 is rotatably coupled to the housing 102 and is configured to extend from the housing 102. In embodiments, the second handle 110 is configured to float on the water surface 101a. In embodiments, the second handle 110 is configured such that an end of the second handle 110 floats on the water surface 101a. In embodiments, the second handle 110 is configured to translate relative to the housing 102 in response to a change in the water level. In other words, a decrease in the height of the water surface 101a permits the second handle 110 to move in the direction of arrow 111. This force causes the second handle 110 to move relative to the housing 102. Alternatively, an increase in the height of the water surface 101a applies a force onto the second handle 110 to in a direction opposite the direction of arrow 111. In embodiments, the second handle 110 moves vertically relative to the housing 102 (e.g., parallel to the direction gravity). In other embodiments, the second handle 110 may move tangentially relative to the housing 102. As discussed in greater detail herein, the translation of the second handle 110 operationally drives a gear assembly positioned in the housing 102, as discussed in more detail herein.

In embodiments, the first handle 108 and the second handle 110 are positioned on axially opposed sides of the housing 102. In other embodiments, the first handle 108 and the second handle 110 may be positioned on the same side or adjacent sides of the housing 102. In embodiments, the first handle 108 and the second handle 110 are configured to operate independently of each other. For example, one of the first handle 108 and the second handle 110 may translate in an upward or downward vertical direction in response to an increase or decrease in the water level, while the other of the first handle 108 and the second handle 110 remains stationary. In another example and as shown in FIG. 1, the first handle 108 moves in an upward vertical direction in response to an increase in the water level, while the second handle 110 simultaneously moves in the downward vertical direction in response to a decrease in the water level. In another example, the first handle 108 moves in a downward vertical direction in response to a decrease in the water level, while the second handle 110 simultaneously moves in the upward vertical direction in response to an increase in the water level. In another example, the first handle 108 and the second handle 110 may both move in the upward vertical direction in response to an increase in the water level and then move in the downward vertical direction in response to a decrease in the water level. In embodiments, the wave energy harnessing device 100 includes more than two handles.

The wave energy harnessing device 100 may further include a first flywheel 128. (e.g., a cogwheel, a spurwheel, a gearwheel, and the like). The first flywheel 128 is positioned on a side of the housing 102. In embodiments, the first flywheel 128 is positioned within the housing 102. As discussed in greater detail herein, translation of the first handle 108 and/or the second handle 110 in either an upward vertical direction or a downward vertical direction results in rotation of the first flywheel 128 in the same direction. In embodiments, the first flywheel 128 is connected to an energy storage/generator. In these embodiments, the rotation of the first flywheel 128 results in the energy storage/generator being wound. This winding causes mechanical energy provided by the first flywheel 128 to be converted into electrical energy stored in a first energy storage/generator device 904. As discussed in greater detail herein, embodiments may include a second flywheel 130. In these embodiments, the first flywheel 128 is connected to a mechanical system so that it may drive the mechanical system. In embodiments, instead of the first flywheel 128, the wave energy harnessing device 100 includes, for example, a spring wound by a clockwork mechanism, a thermal battery, and the like.

Figure 2:
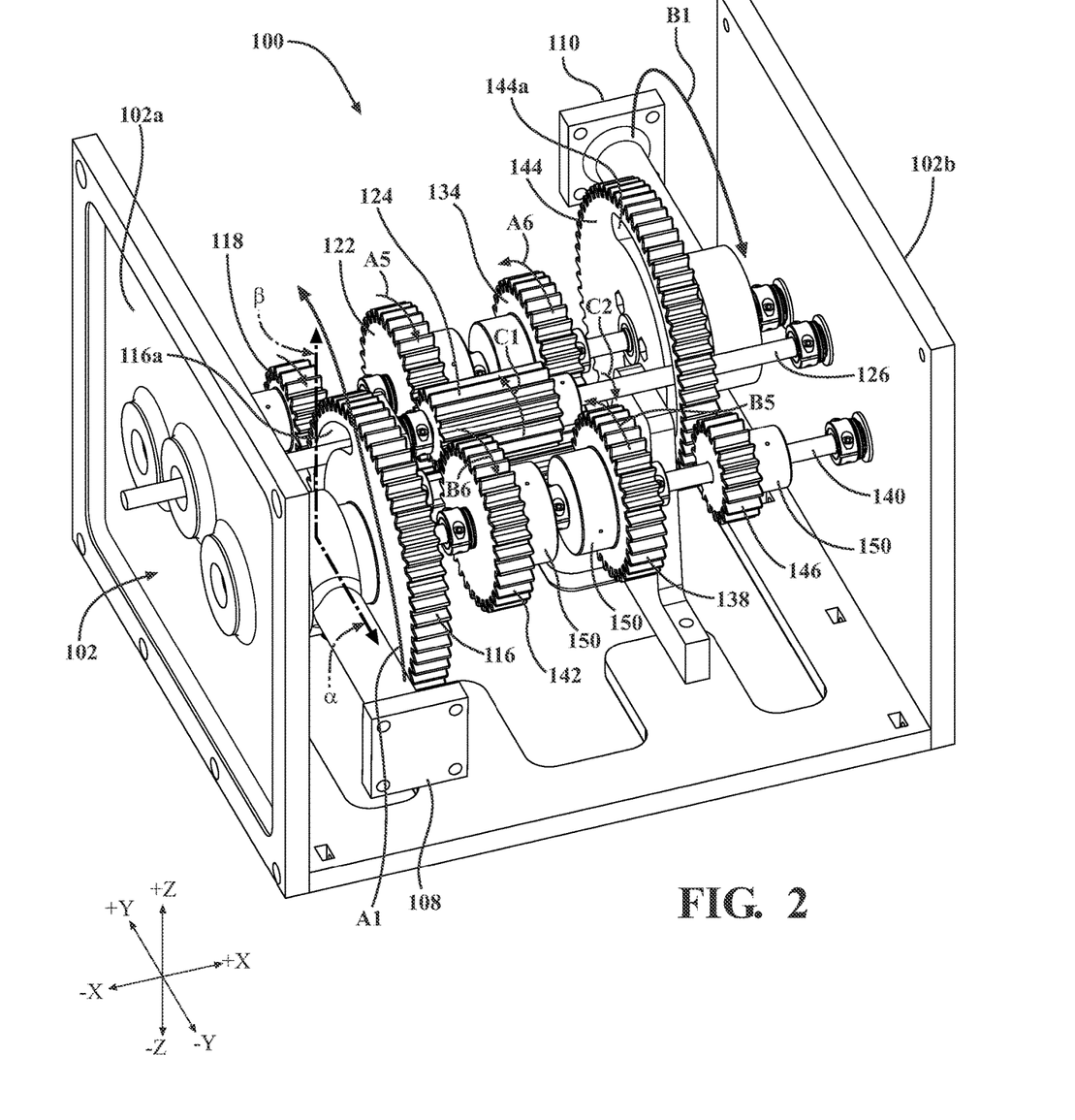
FIG. 2 schematically depicts a perspective view of the wave energy harnessing device of FIG. 1, according to one or more embodiments shown and described herein.

Referring now to FIG. 2, a perspective view of the wave energy harnessing device 100 in a first operation is shown. The wave energy harnessing device 100 defines a first axis α that is parallel to the Y-axis of the coordinate axes depicted herein. The wave energy harnessing device 100 further defines a second axis β that is parallel to the Z-axis of the coordinate axes depicted herein. The housing 102 includes a first wall 102a and a second wall 102b opposite the first wall 102a. The first wall 102a is positioned proximate the first handle 108 (i.e., closer in distance to the first handle 108 relative to the second handle 110) and the second wall 102b is positioned proximate to the second handle 110 (i.e., closer in distance to the second handle 110 relative to the first handle 108). In embodiments, the first handle 108 and the second handle 110 are configured to rotate (e.g., translate, move) in an arc-like, fixed path along a plane defined by the first axis α and the second axis β. When viewed from the first wall 102a in these embodiments, the first handle 108 rotates toward the second axis β in a counterclockwise direction and the second handle 110 rotates toward the second axis β in a clockwise direction in response to an increase in water level. Alternatively, the first handle 108 rotates toward the first axis α in a clockwise direction and the second handle 110 rotates toward the first axis α in a counterclockwise direction in response to a decrease in water level. Throughout the ensuing description, operation of the wave energy harnessing device 100 and specifically the movement of the first handle 108 and the second handle 110 will be given with respect to the rotational directions discussed herein relative to the first axis α and the second axis β as viewed from the first wall 102a.

Figure 3:
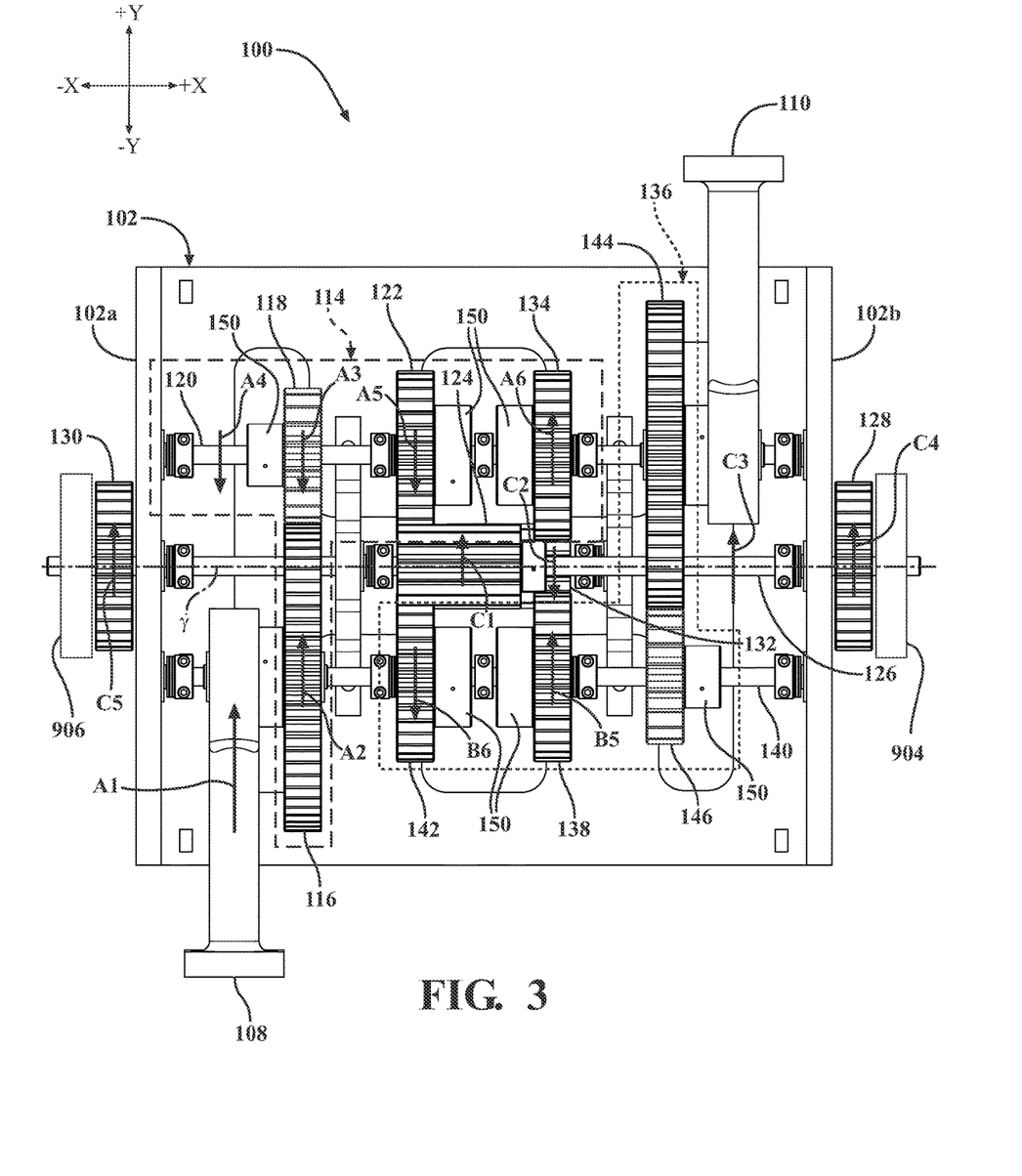
FIG. 3 schematically depicts a top view of the wave energy harnessing device of FIG. 1 during a first rotational operation, according to one or more embodiments shown and described herein.

Referring now to FIG. 3, a top view of the wave energy harnessing device 100 is shown in a first operation. The wave energy harnessing device 100 further defines a third axis γ that is parallel to the X-axis of the coordinate axes depicted herein (e.g., perpendicular to the first axis a and the second axis (3). The third axis γ is positioned substantially along a mid-point of the width of the wave energy harnessing device 100 (e.g., parallel to the first axis a) and extends along a length of the wave energy harnessing device 100 (e.g., perpendicular to the first axis α).

When viewed from the first wall 102a in the first operation, the first handle 108 rotates in a counterclockwise direction A1 in response to an increase in the water level. The wave energy harnessing device 100 further includes a first gear assembly 114. As discussed in greater detail herein, the first gear assembly 114 is coupled to the first handle 108, such that the rotation of the first handle 108 in response to a change in water level, in either direction, results in the operation of the first gear assembly 114. In this way, the wave energy harnessing device 100 is configured to harness wave energy from movement of the first handle 108. In embodiments, the first gear assembly 114 is operatively driven via a belt system (e.g., belt-tensioner, timing belt). As such, the individual gears of the first gear assembly 114 do not need to be in toothed engagement with one another. Rather, a belt may rotatably couple pairs of gears to one another.

The first gear assembly 114 includes a first float gear 116 that is rotatably coupled to the first handle 108 and is configured such that when the first handle 108 rotates in a clockwise or a counterclockwise direction, the first float gear 116 also rotates in the same clockwise or counterclockwise direction, respectively. In the first operation, the first float gear 116 rotates in a counterclockwise direction A2 in response to the first handle 108 rotating in a counterclockwise direction. As discussed in greater detail herein, the first float gear 116 is larger in size relative to other gears in the first gear assembly 114. The first float gear 116 includes a first surcharge slot 116a which enables for an output shaft 126 to extend through the first float gear 116 without disrupting the operation of the first float gear 116 and the output shaft 126. The first surcharge slot 116a is configured to extend through a depth of the first float gear 116 and is further configured to radially extend along a portion of an interior circumference of the first float gear 116. In this way, the first float gear 116 may rotate without physically contacting the output shaft 126.

The first gear assembly 114 further includes a first input gear 118 that is toothily engaged to the first float gear 116. As such, the first input gear 118 is configured to rotate in an opposite direction of the first float gear 116 in response to rotation of the first float gear 116. In the first operation, the first input gear 118 rotates in a clockwise direction A3 in response to the first float gear 116 rotating in a counterclockwise direction. The first input gear 118 is configured to be smaller in size than the first float gear 116. As such, rotation of the first float gear 116 results in the first input gear 118 having higher revolutions per minute (RPM) relative to the RPM of the first float gear 116. In embodiments, the first float gear 116 has a diameter at least twice as large as a diameter of the first input gear 118. In embodiments, the first float gear 116 has a diameter at least four times as large as the diameter of the first input gear 118. In embodiments, the first float gear 116 has a diameter at least six times as large as the diameter of the first input gear 118

The first gear assembly 114 further includes a first input shaft 120. The first input shaft 120 extends parallel to the third axis γ. The first input gear 118 is positioned onto and fixed to the first input shaft 120. Thus, the first input shaft 120 is configured to rotate in the same direction as the first input gear 118 in response to rotation of the first input gear 118. In the first operation, the first input shaft 120 is configured to rotate in a clockwise direction A4 in response to the first input gear 118 rotating in a clockwise direction.

The first gear assembly 114 further includes a first one-way gear 122 (e.g., a unidirectional gear) and is positioned on the first input shaft 120. In the first operation, the first one-way gear 122 is configured to be operationally driven (e.g., directly driven) by rotation of the first input shaft 120 in a clockwise direction. As discussed in greater detail herein, in response to the first handle 108 rotating in a counterclockwise direction, a one-way clutch of a plurality of one-way clutches, such as one-way clutch 802 (FIG. 8), operatively couples the first one-way gear 122 to the first input shaft 120 resulting in the first one-way gear 122 being operationally driven by the first input shaft 120 in a clockwise direction A5.

The wave energy harnessing device 100 further includes an output gear 124 that is toothily engaged to the first one-way gear 122. In the first operation (i.e., when the first one-way gear 122 is operatively driven by the first input shaft 120), the output gear 124 is operatively driven by the first one-way gear 122. As discussed in greater detail herein, the output gear 124 may be operationally driven by multiple gears independently or simultaneously during the various operations. As discussed herein, the output gear 124 is configured to rotate in the same direction during any operation. In the example embodiment, the output gear 124 is configured to always rotate in a counterclockwise direction C1. However, in other embodiments, the output gear 124 is configured to always rotate in a clockwise direction.

The wave energy harnessing device 100 further includes the output shaft 126 that extends parallel to the third axis γ. The output gear 124 is positioned on the output shaft 126 such that the output shaft 126 is configured to rotate in a counterclockwise direction C3, which is the same as the direction C1 in which the output gear 124 rotates. As discussed in greater detail herein, rotation of the output shaft 126 operatively drives the first flywheel 128 positioned on a first axial end of the output shaft 126. As discussed herein, a second flywheel 130 may be provided at an opposite second axial end of the output shaft 126 such that rotation of the output shaft 126 rotates both the first flywheel 128 and the second flywheel 130 in the same direction.

The wave energy harnessing device 100 further includes an auxiliary gear 132 that is toothily engaged to the output gear 124. In the first operation, the auxiliary gear 132 is configured to be driven by the output gear 124 and to rotate in a clockwise direction C2.

The first gear assembly 114 further includes a second one-way gear 134 (e.g., unidirectional gear) and is positioned onto the first input shaft 120. The second one-way gear 134 is toothily engaged to the auxiliary gear 132 and is configured to rotate in response to rotation of the auxiliary gear 132 in a counterclockwise direction A6. The second one-way gear 134 includes a one-way clutch, similar to the one-way clutch 802 (FIG. 8), which operatively couples the second one-way gear 134 to the first input shaft 120. The one-way clutch of the second one-way gear 134 is not engaged during the first operation. This is advantageous as it allows the first gear assembly 114 to be operatively driven either by the first one-way gear 122 or the second one-way gear 134 based on the direction in which the first handle 108 rotates.

The wave energy harnessing device 100 further includes a second gear assembly 136. As discussed in greater detail herein, the second gear assembly 136 is coupled to the second handle 110, such that the rotation of the second handle 110 in response to a change in water level, in either direction, results in the operation of the second gear assembly 136. In embodiments, the second gear assembly 136 is operatively driven via a belt system (e.g., belt-tensioner, timing belt). As such, the individual gears of the second gear assembly 136 do not need to be in toothed engagement with one another. Rather, a belt may rotatably couple pairs of gears to one another.

The second gear assembly 136 is operatively independent of the first gear assembly 114, while being mechanically integrated (i.e., intertwined or connected) with the first gear assembly 114. In other words, rotation of the first handle 108 results in rotation of select gears of the second gear assembly 136. However, in the first operation, the second gear assembly 136 is not configured to operationally drive the output shaft 126 in response to rotation of the first handle 108. Additionally, rotation of the second handle 110 rotates select gears of the first gear assembly 114 without being operationally driven. In this way, the wave energy harnessing device 100 is configured to harness wave energy from the first handle 108 and the second handle 110 both individually and simultaneously due to the first handle 108 and the second handle 110 both being operated in response to changes in water level. This is advantageous as the wave energy harnessing device 100 is capable of increasing the harnessing capabilities by a factor of two. For example, if the first handle 108 rotates in a counterclockwise direction in response to a water level increase at the first handle 108 and the second handle 110 also rotates in a counterclockwise direction in response to a water level decrease at the second handle 110, the wave energy harnessing device 100 is capable of harnessing energy from movement of both the first handle 108 and the second handle 110. In another example, if the first handle 108 rotates in a counterclockwise direction and the second handle 110 rotates in a clockwise direction, where both movements are in response to a localized water level increase, the wave energy harnessing device 100 is still capable of harnessing energy from both movements.

As discussed in greater detail herein, the wave energy harnessing device 100 is capable of receiving inputs from the first gear assembly 114 and the second gear assembly 136 by operatively connecting each respective movements together. In this way, the output gear 124 is able to be operatively driven by gears of the first gear assembly 114 and the second gear assembly 136 without being disrupted if either the first gear assembly 114 or the second gear assembly 136 begin or halt operation.

The second gear assembly 136 includes a third one-way gear 138 (e.g., unidirectional gear) engaging the auxiliary gear 132. Continuing in the first operation, rotation of the auxiliary gear 132 results in the third one-way gear 138 rotating in a counterclockwise direction B5.

The second gear assembly 136 further includes a second input shaft 140. The second input shaft 140 extends parallel to the third axis γ. The third one-way gear 138 is positioned onto and fixed to the second input shaft 140. The third one-way gear 138 includes a one-way clutch, such as the one-way clutch 802 (FIG. 8), which operatively couples the third one-way gear 138 to the second input shaft 140.

The second gear assembly 136 further includes a fourth one-way gear 142 (e.g., unidirectional gear) engaging the output gear 124. In the first operation, rotation of the output gear 124 causes the fourth one-way gear 142 to rotate in a clockwise direction B6. The fourth one-way gear 142 includes a one-way clutch, such as the one-way clutch 802 (FIG. 8), which operatively couples the fourth one-way gear 142 to the second input shaft 140.

The wave energy harnessing device 100 may further include a plurality of spacers 150. Each of the plurality of spacers 150 are coupled onto the first input shaft 120 or the second input shaft 140. Each of the plurality of spacers 150 are in contact with one of the gears within the first gear assembly 114 and second gear assembly 136. Each of the plurality of spacers 150 are utilized to define a position of the respective gear by being in contact with the respective gear. In this way, gear misalignment between respective gears is mitigated.

Figure 4:
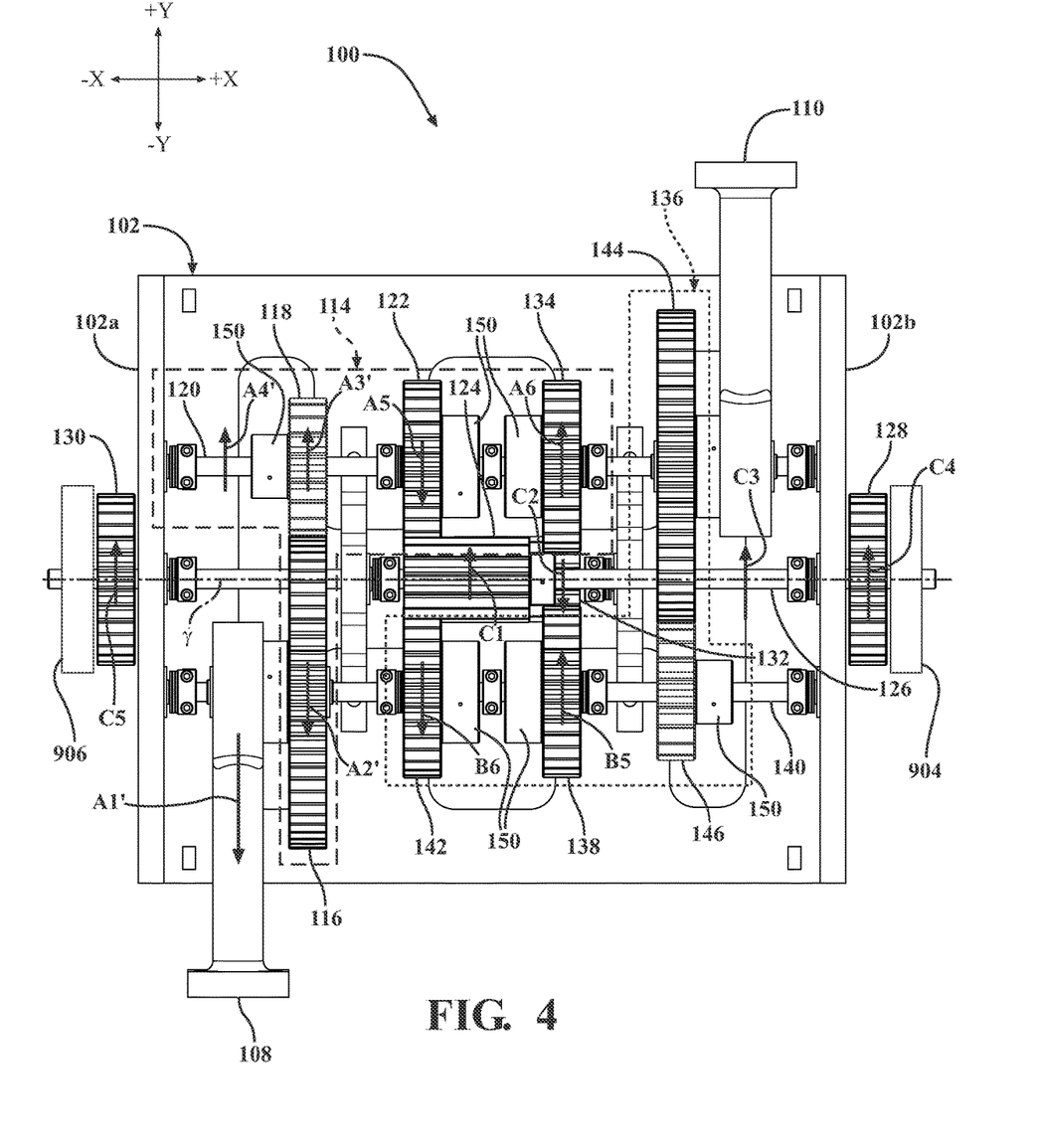
FIG. 4 schematically depicts a top view of the wave energy harnessing device of FIG. 1 during a second rotational operation, according to one or more embodiments shown and described herein.

Referring now to FIG. 4, a top view of the wave energy harnessing device 100 is shown in a second operation. When viewed from the first wall 102a in the second operation, the first handle 108 rotates in a clockwise direction A1' in response to a decrease in water level. In the second operation, the first float gear 116 rotates in a clockwise direction A2' in response to the first handle 108 rotating in a clockwise direction. The first input gear 118 rotates in a counterclockwise direction A3' in response to the first float gear 116 rotating in a clockwise direction A2'. The first input shaft 120 is configured to rotate in a counterclockwise direction A4' in response to the first input gear 118 rotating in a counterclockwise direction A3'.

In the second operation, the one-way clutch for the second one-way gear 134 is enabled. This results in the second one-way gear 134 to be operationally driven by rotation of the first input shaft 120 in a counterclockwise direction A6. The second one-way gear 134 operatively drives the auxiliary gear 132, such that the auxiliary gear 132 rotates in the clockwise direction C2. Accordingly, the auxiliary gear 132 operatively drives the output gear 124 in the counterclockwise direction C1, which in turn operatively drives the output shaft 126 in the counterclockwise direction C3. Accordingly, the output shaft 126 operatively drives the first flywheel 128 and the second flywheel 130 in a counterclockwise direction C4 and C5, respectively.

Continuing in the second operation, the output gear 124 rotates both the first one-way gear 122 in the clockwise direction A5 and the fourth one-way gear 142 in the clockwise direction A6. Both the one-way clutch of the first one-way gear 122 and the one-way clutch of the fourth one-way gear 142 are not enabled during the second operation. The second operation also does not enable the one-way clutch of the auxiliary gear 132, which results in the auxiliary gear 132 rotating the third one-way gear 138 in the counterclockwise direction B5, without operatively driving the third one-way gear 138.

Figure 5:
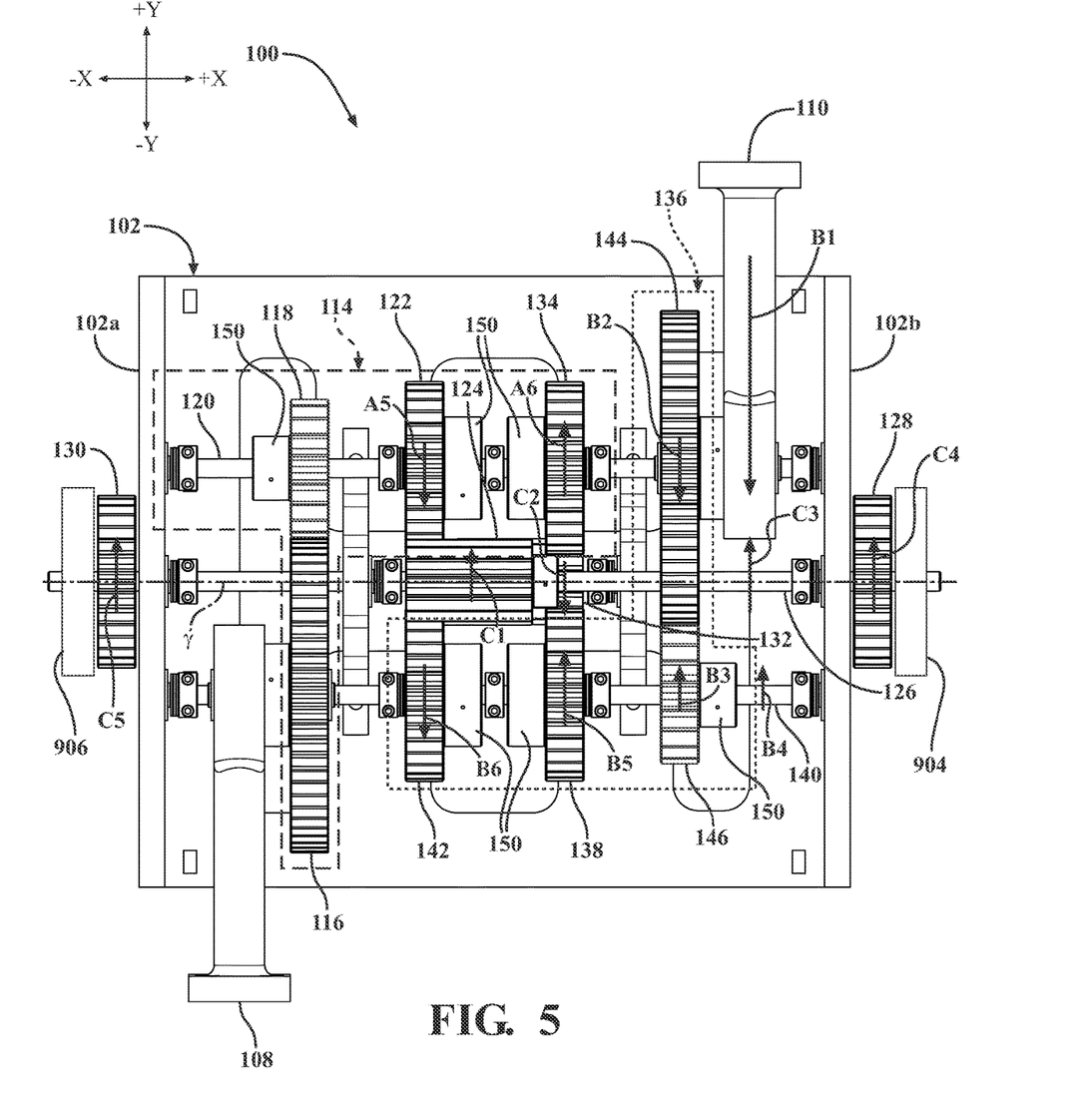
FIG. 5 schematically depicts a top view of the wave energy harnessing device of FIG. 1 during a third rotational operation, according to one or more embodiments shown and described herein.

Referring now to FIG. 5, a top view of the wave energy harnessing device 100 is shown in a third operation. When viewed from the first wall 102a in the third operation, the second handle 110 rotates in a clockwise direction B1 in response to an increase in water level. As discussed in greater detail herein, the second gear assembly 136 is coupled to the second handle 110, such that the rotation of the second handle 110 in response to a change in water level, in either direction, results in the operation of the second gear assembly 136. In this way, the wave energy harnessing device 100 is configured to harness wave energy from movement of the second handle 110.

The second gear assembly 136 includes a second float gear 144 that is rotatably coupled to the second handle 110 and is configured such that when the second handle 110 rotates in a clockwise or a counterclockwise direction, the second float gear 144 also rotates in the same clockwise or counterclockwise direction, respectively. The second float gear 144 includes a second surcharge slot 144a which enables for the output shaft 126 to extend through the second float gear 144 without disrupting the operation of the second float gear 144 and the output shaft 126. The second surcharge slot 144a is configured to extend through a depth of the second float gear 144 and is further configured to radially extend along a portion of an interior circumference of the second float gear 144. In this way, the second float gear 144 may rotate without physically contacting the output shaft 126.

In the third operation, the second float gear 144 rotates in a clockwise direction B2 in response to the second handle 110 rotating in the clockwise direction B1. As discussed in greater detail herein, the second float gear 144 is larger in size relative to other gears of the second gear assembly 136. The second float gear 144 is coaxially arranged relative to the first input gear 118, the first one-way gear 122, and the second one-way gear 134 upon the first input shaft 120.

The second gear assembly 136 further includes a second input gear 146 that is toothily engaged to the second float gear 144. As such, the second input gear 146 is configured to rotate in an opposite direction of the second float gear 144 in response to rotation of the second float gear 144. The second input gear 146 is positioned on the second input shaft 140 and is configured to rotate the second input shaft 140 in the same direction.

In the third operation, the second input gear 146 rotates in a counterclockwise direction B3 in response to the second float gear 144 rotating in the clockwise direction B2. The second input gear 146 is configured to be smaller in size than the second float gear 144. As such, rotation of the second float gear 144 results in the second input gear 146 having higher a RPM relative to the RPM of the second float gear 144. In embodiments, the second float gear 144 has a diameter at least twice as large as the second input gear 146. In embodiments, the second float gear 144 has a diameter at least four times as large as the second input gear 146. In embodiments, the second float gear 144 has a diameter at least six times as large as the second input gear 146.

Continuing in the third operation, the one-way clutch for the third one-way gear 138 is enabled. This results in the third one-way gear 138 to be operationally driven by rotation of the second input shaft 140 in the counterclockwise direction B5. The third one-way gear 138 operatively drives the auxiliary gear 132, such that the auxiliary gear 132 rotates in the clockwise direction C2. Accordingly, the auxiliary gear 132 operatively drives the output gear 124 in the counterclockwise direction C1, which in turn operatively drives the output shaft 126 in the counterclockwise direction C3. Accordingly, the output shaft 126 operatively drives the first flywheel 128 and the second flywheel 130 in the counterclockwise direction C4 and C5, respectively. The auxiliary gear 132 is also is toothily engaged to the second one-way gear 134, thereby rotating the second one-way gear 134 in the counterclockwise direction A6 which does not have the corresponding one-way clutch enabled during the third operation.

Additionally, the output gear 124 rotates both the first one-way gear 122 in the clockwise direction A5 and the fourth one-way gear 142 in the clockwise direction B6. Both the one-way clutch of the first one-way gear 122 and the one-way clutch of the fourth one-way gear 142 are not enabled during the third operation.

Figure 6:
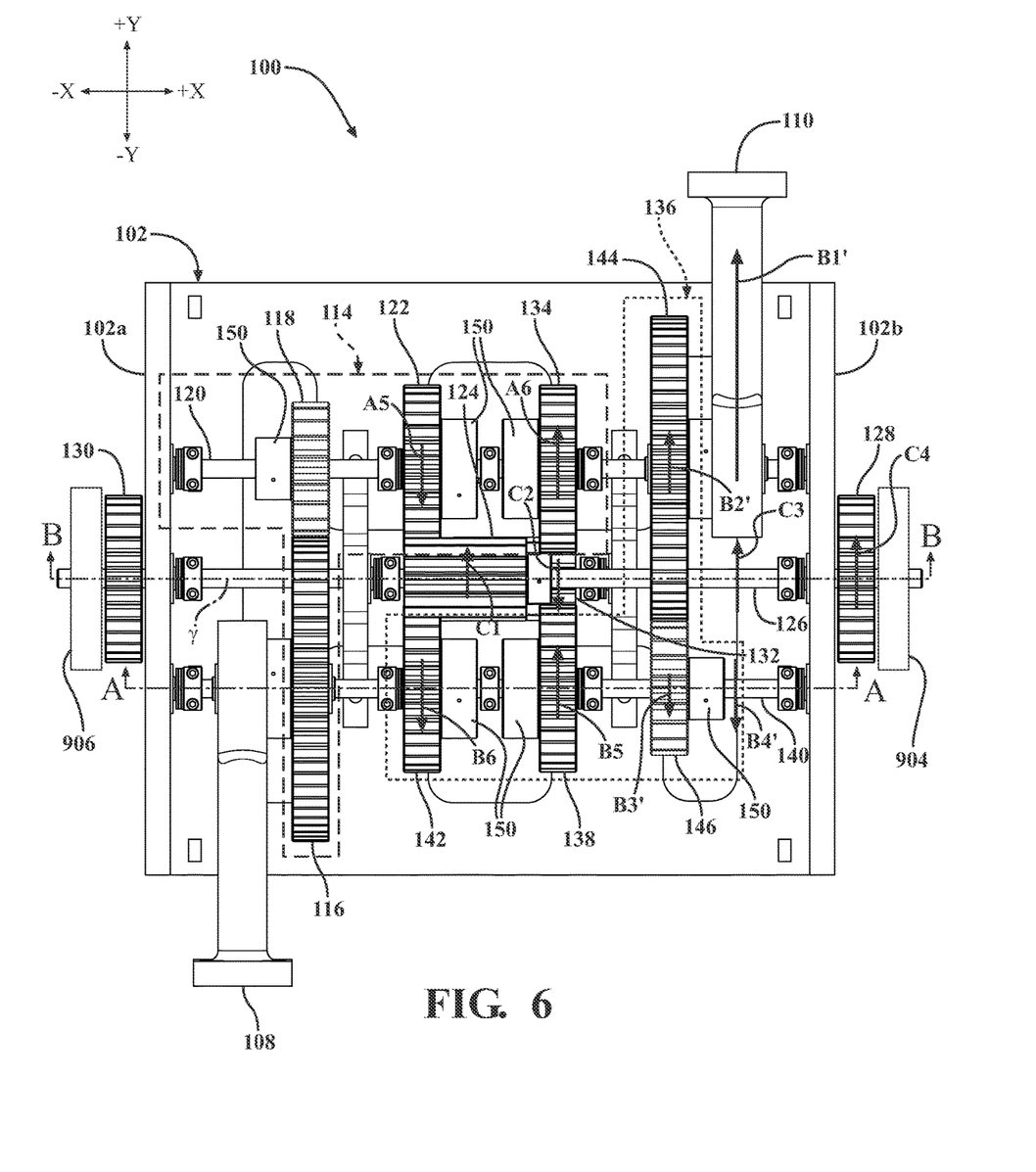
FIG. 6 schematically depicts a top view of the wave energy harnessing device of FIG. 1 during a fourth rotational operation, according to one or more embodiments shown and described herein.

Referring now to FIG. 6, a top view of the wave energy harnessing device 100 is shown in a fourth operation. When viewed from the first wall 102a in the fourth operation, the second handle 110 rotates in a counterclockwise direction B1' in response to a decrease in water level. The second float gear 144 rotates in a counterclockwise direction B2' in response to the second handle 110 rotating in the counterclockwise direction B1'. The second input gear 146 rotates in a clockwise direction B3' in response to the second float gear 144 rotating in the counterclockwise direction B2'. The second input shaft 140 is operatively driven in a clockwise direction B4' by the rotation of the second input gear 146 in the clockwise direction B3'.

Continuing in the fourth operation, the one-way clutch for the fourth one-way gear 142 is enabled. This results in the fourth one-way gear 142 to be operationally driven by rotation of the second input shaft 140 in the clockwise direction B6. The fourth one-way gear 142 operatively drives the output gear 124 in the counterclockwise direction C1, which in turn operatively drives the output shaft 126 in the counterclockwise direction C3. Accordingly, the output shaft 126 operatively drives the first flywheel 128 and the second flywheel 130 in the counterclockwise direction C4 and C5, respectively.

The output gear 124 additionally rotates the first one-way gear 122 in the clockwise direction A5 whose one-way clutch is not enabled during the four operation. The output gear 124 additionally rotates the auxiliary gear 132, such that the auxiliary gear 132 rotates in the clockwise direction C2.

Additionally, the auxiliary gear 132 rotates both the second one-way gear 134 and the third one-way gear 138. Both the one-way clutch of the second one-way gear 134 and the third one-way gear 138 are not enabled during the fourth operation.

Figure 7:
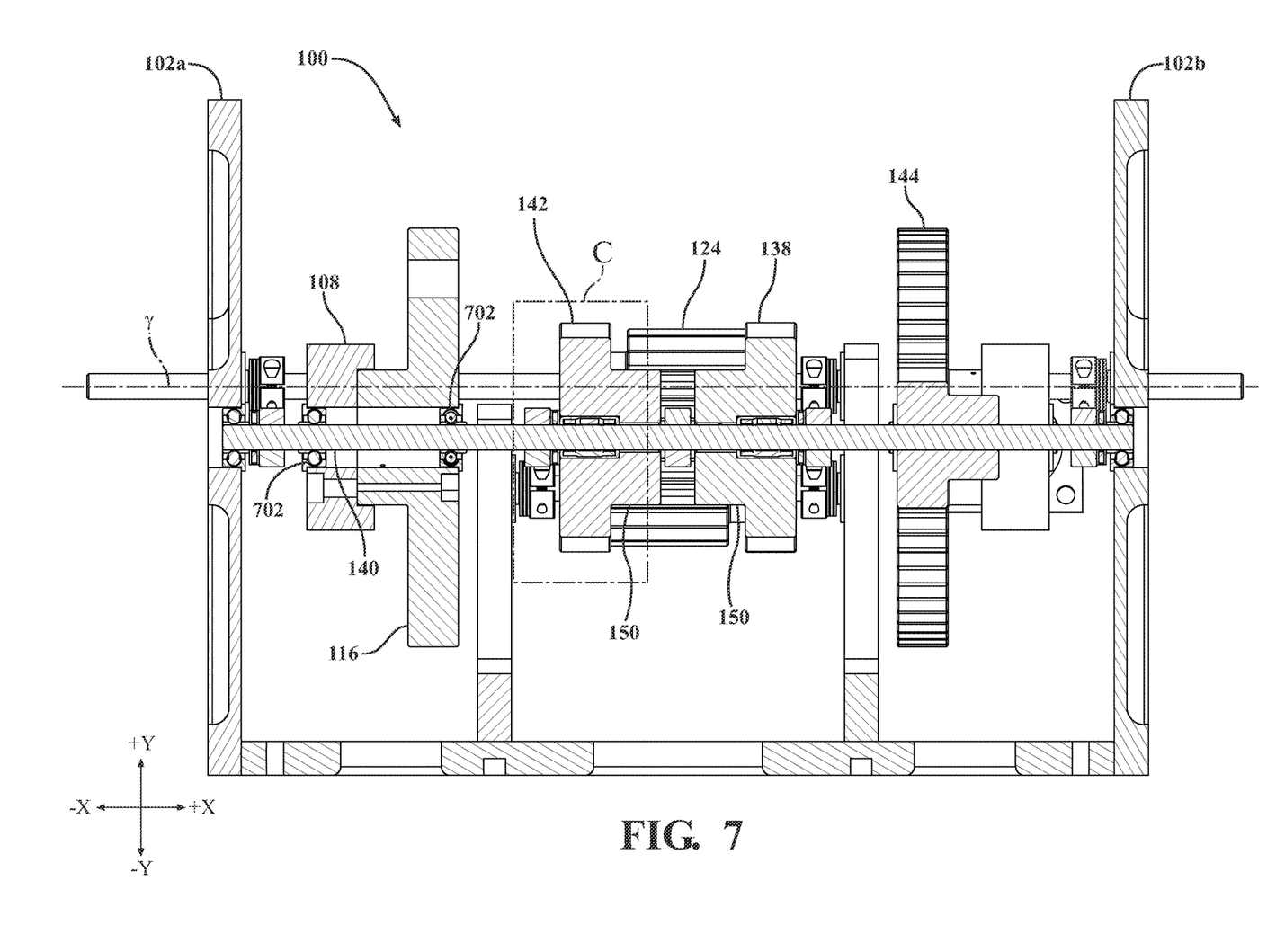
FIG. 7 schematically depicts a cross-sectional view of the wave energy harnessing device of FIG. 1 taken along line A-A in FIG. 6, according to one or more embodiments shown and described herein.

Referring now to FIG. 7, a cross-sectional view of the wave energy harnessing device 100 of FIG. 1 taken along line A-A in FIG. 6 is shown. The wave energy harnessing device 100 further includes a plurality of ball bearings 702. The plurality of ball bearings 702 are small circular elements that reduce friction during rotation of components. A first set of the plurality of ball bearings 702 is positioned within the first handle 108 and a second set of the plurality of ball bearings 702 is positioned within the first float gear 116. More particularly, the first set of the plurality of ball bearings 702 is further positioned between the first handle 108 and the second input shaft 140, and the second set of the plurality of ball bearings 702 is positioned between the first float gear 116 and the second input shaft 140. Accordingly, the plurality of ball bearings 702 disengage the first handle 108 and the first float gear 116 from the second input shaft 140. Due to the disengagement of the first handle 108 and the first float gear 116 with the second input shaft 140, rotation of the first float gear 116 and the first float gear 116 does not disrupt the rotation of the second input shaft 140. This is advantageous as it facilitates for the first gear assembly 114 to operate independently of the second gear assembly 136. Although not shown, it should be appreciated that ball bearings are also positioned within the second handle 110 and the second float gear 144 to disengage the second handle 110 and the second float gear 144 from the first input shaft 120.

Figure 8:
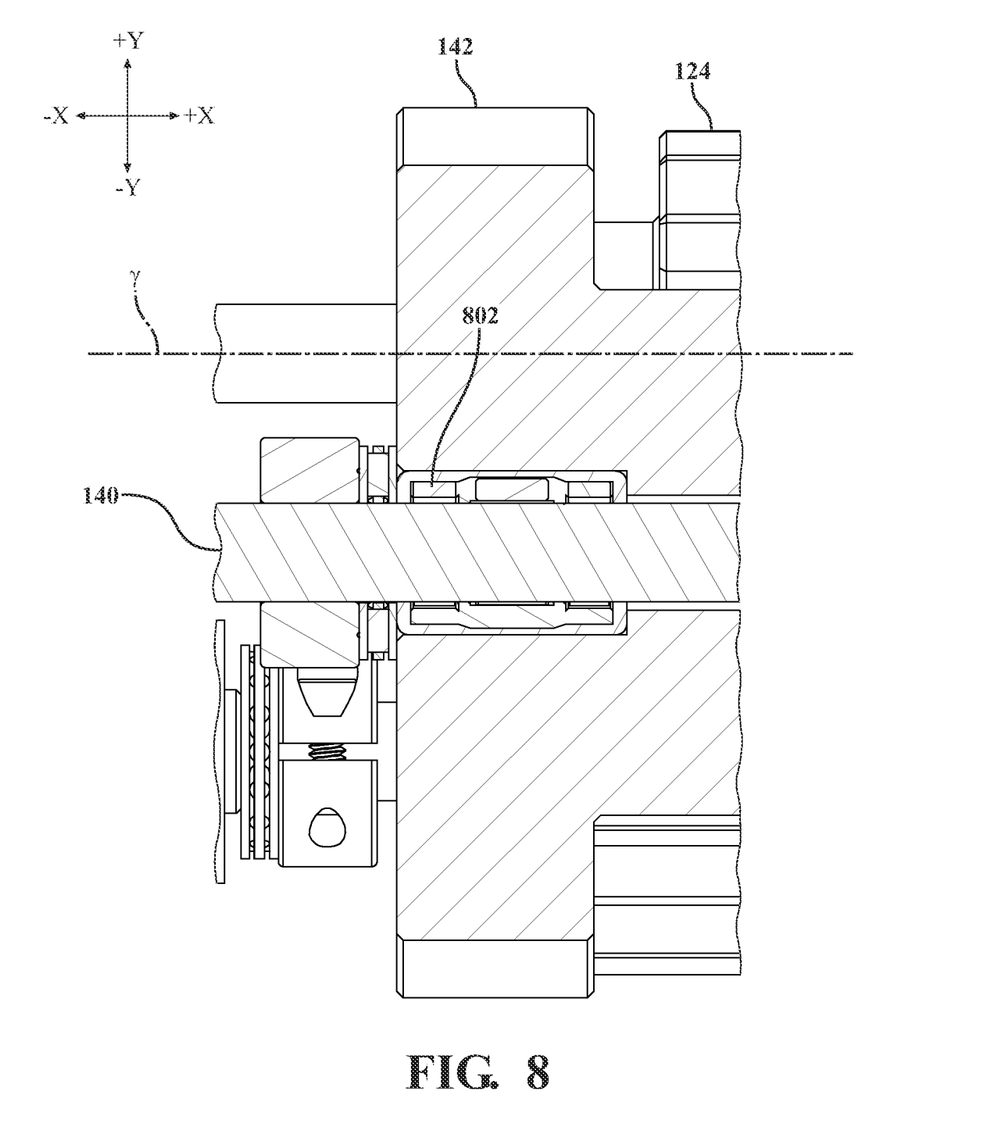
FIG. 8 schematically depicts an enlarged view of section C of FIG. 7, according to one or more embodiments shown and described herein.

Referring now to FIG. 8, an enlarged view of the wave energy harnessing device 100 taken at section C in FIG. 7 is shown. As discussed in greater detail above, the wave energy harnessing device 100 further includes a plurality of one-way clutches 802. One of the plurality of one-way clutches 802 is shown positioned within the fourth one-way gear 142, but it should be understood that additional one-way clutches 802 may be positioned with other gears. For example, one of the plurality of one-way clutches 802 are positioned between each of the first one-way gear 122, the second one-way gear 134, the third one-way gear 138, and the fourth one-way gear 142 and the respective input shaft. In embodiments, each of the plurality of one-way clutches 802 are configured to removably attach (e.g., clutch, grasp, clasp) one of the one-way gears to the respective input shaft during rotation of the respective input shaft in a particular direction and disengage the respective input shaft during rotation of the respective input shaft in an opposite direction. A first set of the plurality of one-way clutches 802 (e.g., such as those associated with the first one-way gear 122 and the second one-way gear 134) may be operatively coupled to the first handle 108, such that the rotation of the first handle 108 in a first direction engages the one-way clutch for the first one-way gear 122 while disengaging the one-way clutch for the second one-way gear 134. Additionally, rotation of the first handle 108 in a second direction engages the one-way clutch for the second one-way gear 134 while disengaging the one-way clutch for the first one-way gear 122. In this way, the first gear assembly 114 is configured to be operatively driven by rotation of the first handle 108 in either direction.

A second set of the plurality of one-way clutches 802 (e.g., such as those associated with the third one-way gear 138 and the fourth one-way gear 142) may be operatively coupled to the second handle 110, such that the rotation of the second handle 110 in a first direction engages the one-way clutch for the third one-way gear 138 while disengaging the one-way clutch for the fourth one-way gear 142. Additionally, rotation of the second handle 110 in a second direction engages the one-way clutch for the fourth one-way gear 142 while disengaging the one-way clutch for the third one-way gear 138. In this way, the second gear assembly 136 is configured to be operatively driven by rotation of the second handle 110 in either direction.

In embodiments, the plurality of one-way clutches 802 are electronically controlled such that movement of the first handle 108 and the second handle 110 are electronically communicated with the plurality of one-way clutches 802 so that the plurality of one-way clutches 802 can operatively couple or operatively disengage the respective one-way gear.

Figure 9:
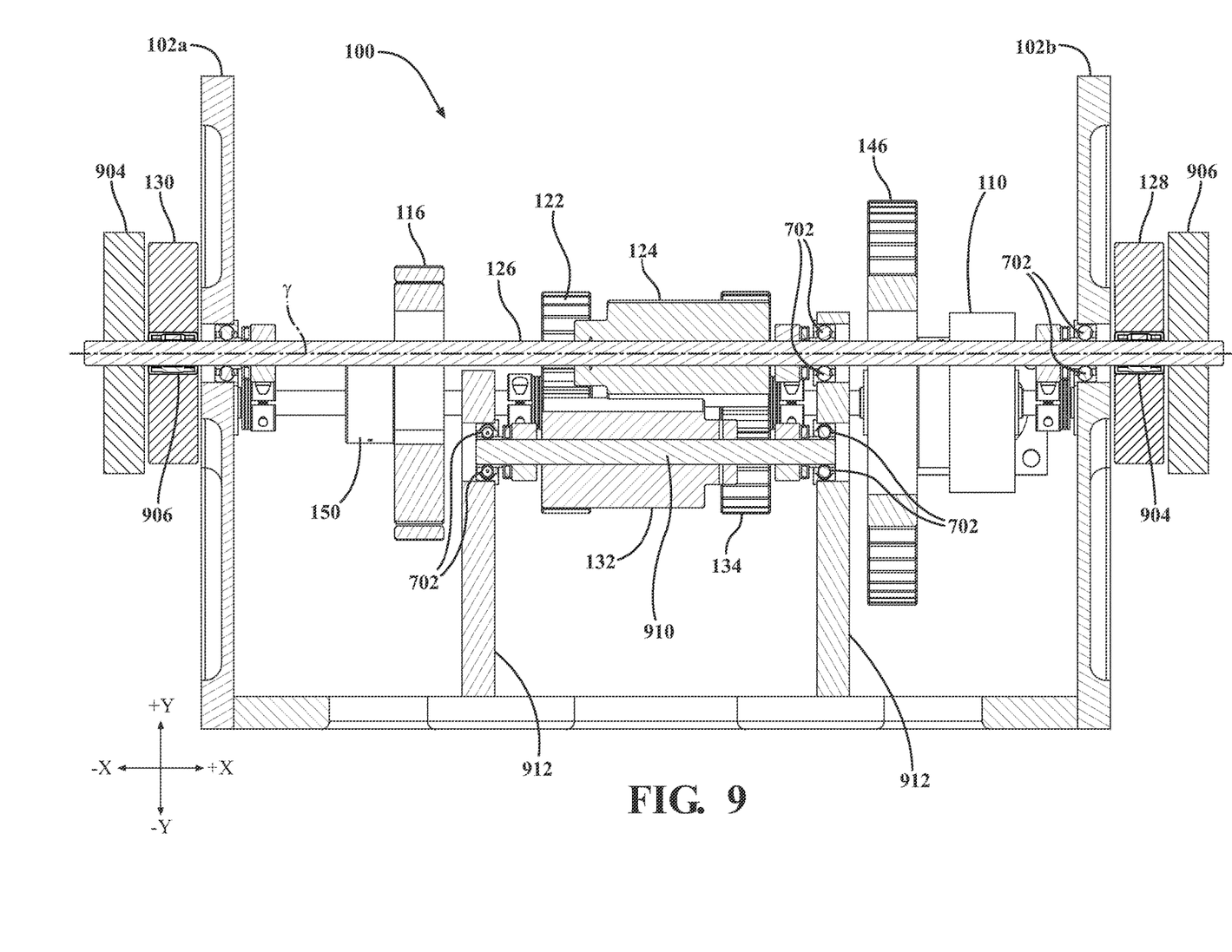
FIG. 9 schematically depicts a cross-sectional view of the wave energy harnessing device of FIG. 1 taken along line B-B in FIG. 6, according to one or more embodiments shown and described herein.

Referring now to FIG. 9, a cross-sectional view of the wave energy harnessing device 100 taken along line B-B in FIG. 6 is shown. The wave energy harnessing device 100 further includes a set of flywheel one-way clutches 902, similar to the one-way clutches 802. The set of flywheel one-way clutches 902 are positioned between each of the first flywheel 128 and the second flywheel 130 and the output shaft 126. In response to the rotation of the output shaft 126, the set of flywheel one-way clutches 902 operatively couple the set of flywheel one-way clutches 902 to the output shaft 126. This results in the first flywheel 128 and the second flywheel 130 being operatively driven by the output shaft 126 in a single direction. In response to the output shaft 126 no longer rotating, the set of flywheel one-way clutches 902 disengages each of the first flywheel 128 and the second flywheel 130 from the output shaft 126. This results in the first flywheel 128 and the second flywheel 130 continuing to rotate after being disengaged from the output shaft 126. The one-way clutches 802 are commercially available and sold by Renold (e.g., such as the Renold REUK series).

The wave energy harnessing device 100 further includes a countershaft 910. The countershaft 910 may extend parallel to the third axis γ (e.g., parallel to the X-axis). The auxiliary gear 132 is positioned onto and fixed to the countershaft 910. Thus, the countershaft 910 is configured to rotate in the same direction as the auxiliary gear 132 in response to rotation of the auxiliary gear 132. The countershaft extends through a plurality of supports 912 of the wave energy harnessing device 100 and is coupled to the plurality of supports 912. The plurality of supports 912 extend from a bottom surface of the housing 102 along the Y-axis. The plurality of supports 912 may be integrated into the bottom surface of the housing 102 or may be coupled to the bottom surface of the housing 102. A third set of the plurality of ball bearings 702 is interposed between the countershaft 910 and the plurality of supports 912. In this way, the countershaft 910 is configured to rotate in response to rotation of the auxiliary gear 132 while being supported by plurality of supports 912.

The wave energy harnessing device 100 further includes the first energy storage/generator device 904 and a second energy storage/generator 906. The first energy storage/generator device 904 is operatively coupled to the first flywheel 128 and is configured to be operatively driven by the first flywheel 128. This rotation causes the first energy storage/generator device 904 to be wound. This winding causes mechanical energy provided by the first flywheel 128 to be converted into electrical energy stored in the first energy storage/generator device 904. In embodiments, the first energy storage/generator device 904 may be a mechanical system, such as a spring storage system, a transmission, a dampening storage system, a hydraulic system, a thermal battery, and the like.

The second energy storage/generator 906 is operatively coupled to the second flywheel 130 and is configured to be operatively driven by the second flywheel 130. This rotation causes the second energy storage/generator 906 to be wound. This winding causes mechanical energy provided by the second flywheel 130 to be converted into electrical energy stored in the second energy storage/generator 906. In embodiments, the second energy storage/generator 906 may be a mechanical system, such as a spring storage system, a transmission, a dampening storage system, a hydraulic system, a thermal battery, etc.

Figure 10:
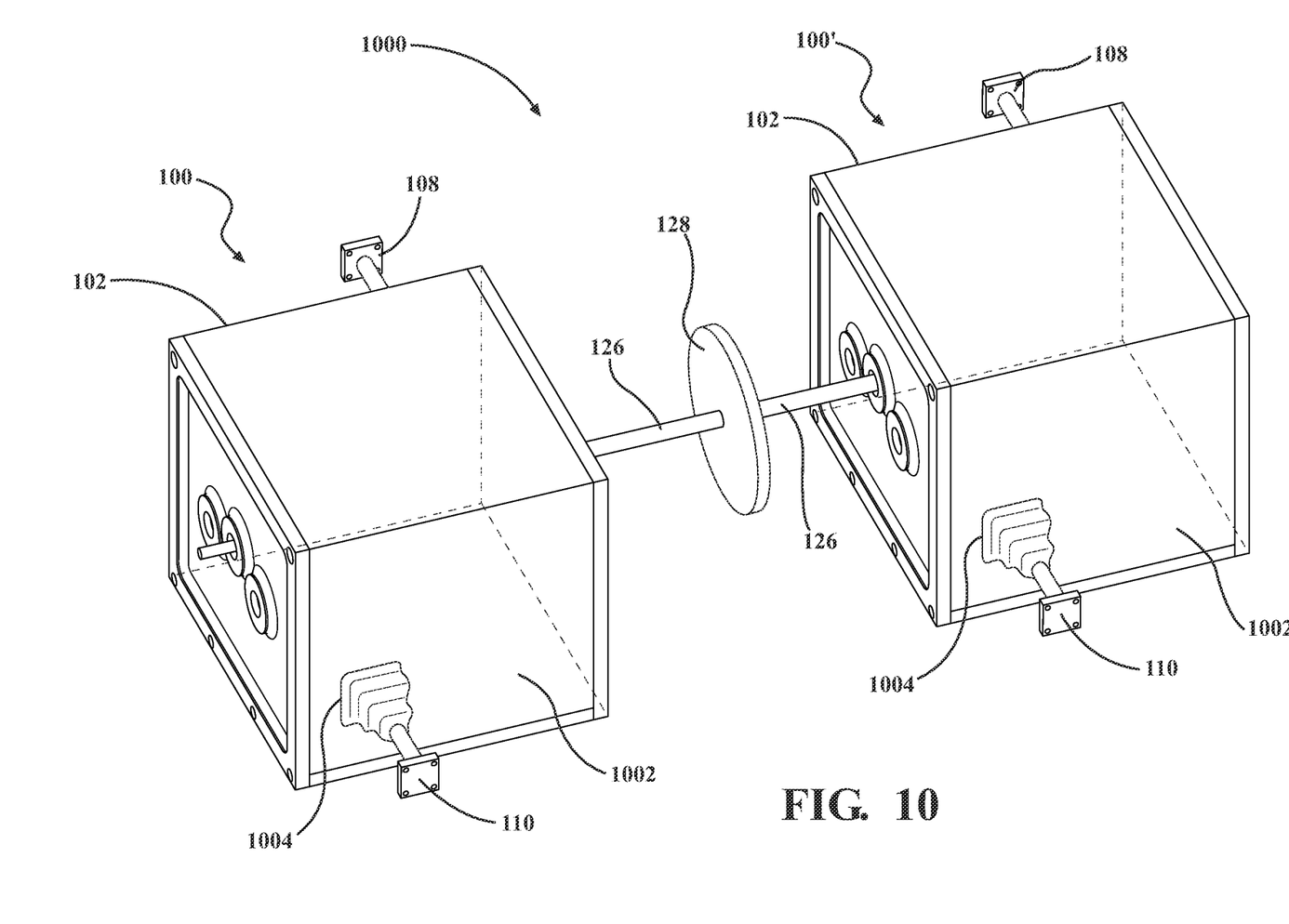
FIG. 10 schematically depicts a perspective view of a wave energy harnessing system having a first wave energy harnessing device operatively coupled to a second wave energy harnessing device.

Referring now to FIG. 10, a perspective view of a wave energy harnessing system 1000 having a first wave energy harnessing device 100 operatively coupled to a second wave energy harnessing device 100' is illustrated according to one or more embodiments described herein. The second wave energy harnessing device 100' may be similarly configured as the first wave energy harnessing device 100, as described above. In embodiments, the first wave energy harnessing device 100 and the second energy device 100' share the output shaft 126 (e.g., the output shaft 126 extends from the first wave energy harnessing device 100 to the second energy harnessing device 100'). In these embodiments, the first wave energy harnessing device 100 and the second energy harnessing device 100' co-operatively drive the output shaft 126, thereby operatively driving the first flywheel 128 positioned on the output shaft 126. In embodiments, the first wave energy harnessing device 100 and the second energy harnessing device 100' have independent, coaxial output shafts 126. In these embodiments, the first wave energy harnessing device 100 and the second energy device 100' individually operatively drive the first flywheel 128. In embodiments, a plurality of wave energy harnessing devices 100 may be operatively coupled.

As shown in FIG. 10, an enclosure 1002 may be provided to at least partially encase the housing 102 to provide a water-tight seal and isolate at least the first gear assembly 114 and the second gear assembly 136 from the environmental elements. As shown, the first handle 108 and the second handle 110 extend through the enclosure 1002. A sealing member 1004 may be provided between the enclosure 1002 and each of the first handle 108 and the second handle 110 to provide a water-tight seal between the enclosure 1002 and the first handle 108 and the second handle 110. Additionally, as shown in FIG. 10, a wave energy harnessing system 1000 may include the wave energy harnessing device 100 and a second wave energy harnessing device 100' coupled to the wave energy harnessing device 100. It should be appreciated that the second wave energy harnessing device 100' has the same structure as the wave energy harnessing device 100 and thus will include like reference numbers. As such, the output shaft 126 of the wave energy harnessing device 100 and the second wave energy harnessing device 100' are coupled to the same first flywheel 128. This allows the wave energy harnessing device 100 and the second wave energy harnessing device 100' to each rotate the first flywheel simultaneously without affecting operation of the other device. Although only a pair of wave energy harnessing devices are shown, it should be appreciated that the wave energy harnessing system 1000 may include any number of wave energy harnessing devices coupled to one another in series.

From the above, it is to be appreciated that defined herein is a wave energy harnessing device capable of harnessing wave energy from a pair of spaced apart floats that rotatably drive an output shaft in a single direction regardless of an increase or decrease in water level, thereby increasing the efficiency of harnessing wave energy.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wave energy harnessing device comprising:
a first movable device configured to translate in response to a level change in a water body;
a first float gear configured to rotate in in response to translation of the first movable device;
a first input shaft rotatably driven by the first float gear in response to rotation of the first float gear;
an output shaft restricted to rotation in a first direction;
a pair of one-way clutches coupled to the first input shaft and the output shaft and configured to operatively couple the first input shaft to the output shaft in response to rotation of the first input shaft either in the first direction or in a second direction; and
a second movable device configured to translate in the first direction in response to an increase of water level in the water body and configured to translate in the second direction in response to a decrease of water level in the water body,
wherein translation of the first movable device and the second movable device in either the first direction or the second direction results in rotation of the output shaft in the first direction.

2. The wave energy harnessing device of claim 1, further comprising:
a second float gear configured to rotate in either the first direction or the second direction corresponding to translation of the second movable device;
a second input shaft rotatably driven by the second float gear in either the first direction or the second direction in response to rotation of the second float gear;
a third one-way clutch coupled to the second input shaft and the output shaft, the third one-way clutch operatively coupling the second input shaft to the output shaft in response to rotation of the second input shaft in the first direction; and a fourth one-way clutch coupled to the second input shaft and the output shaft, the fourth one-way clutch operatively coupling the second input shaft to the output shaft in response to rotation of the second input shaft in the second direction.

3. The wave energy harnessing device of claim 2, wherein the output shaft is operatively driven by the first input shaft and the second input shaft simultaneously when both the first movable device and the second movable device translate in either the first direction or the second direction.

4. The wave energy harnessing device of claim 2, wherein the first movable device is a first handle positioned at a surface of the water body and the second movable device is a second handle positioned at the surface of the water body.

5. The wave energy harnessing device of claim 1, further comprising a first flywheel device operatively connected to the output shaft, the first flywheel device is operatively connected to the output shaft by a fifth one-way clutch, the fifth one-way clutch configured to operatively engage one of the output shaft and the first flywheel device when the output shaft rotates and is further configured to operatively disengage one of the output shaft and the first flywheel device when the output shaft does not rotate.

6. The wave energy harnessing device of claim 1, further comprising a first flywheel device operatively connected to the output shaft and an energy storage/generator device operatively coupled to the first flywheel device, the energy storage/generator device configured to convert rotational energy from the first flywheel device into electrical energy.

7. The wave energy harnessing device of claim 1, wherein the pair of one-way clutches are disposed within a first one-way gear configured to rotate in the first direction and a second one-way gear configured to rotate in the second direction.

8. The wave energy harnessing device of claim 1, wherein the first float gear is coupled to a first input gear, the first input gear being four to six times larger in diameter than the first input gear.

9. The wave energy harnessing device of claim 1, further comprising a first flywheel device operatively connected to the output shaft and a second flywheel device operatively connected to the output shaft, wherein the first flywheel device is disposed on a first axial end of the output shaft and the second flywheel device is disposed on a second axial end of the output shaft opposite the first axial end.

10. A wave energy harnessing device comprising:
a pair of gear assemblies, each comprising:
  a movable device configured to translate in either a first direction or a second direction in response to a water level change of a water body;
  a float gear rotatably coupled to the movable device and configured to rotate in response to translation of the movable device;
  an input shaft rotatably driven by the float gear in response to rotation of the float gear;
  a first one-way clutch disposed within a first one-way gear rotatably coupled to the float gear and restricted to rotate in the first direction; and
  a second one-way clutch disposed within a second one-way gear rotatably coupled to the float gear and restricted to rotate in the second direction; and
an output shaft restricted to rotate in the first direction, the output shaft operatively coupled to the input shaft by the first one-way clutch in response to rotation of the float gear in the first direction and operatively coupled to the input shaft by the second one-way clutch in response to rotation of the float gear in the second direction,
wherein translation of the movable device in either of the pair of gear assemblies in either the first direction or the second direction results in rotation of the output shaft in the first direction.

11. The wave energy harnessing device of claim 10, wherein the output shaft is operatively driven by the input shaft of both gear assemblies simultaneously when the movable device of both gear assemblies translate in either the first direction or the second direction.

12. The wave energy harnessing device of claim 10, wherein the movable device is a handle positioned at a surface of the water body.

13. The wave energy harnessing device of claim 10, further comprising a first flywheel device operatively connected to the output shaft by a flywheel one-way clutch, the flywheel one-way clutch being configured to operatively engage one of the output shaft and the first flywheel device when the output shaft rotates and is further configured to operatively disengage one of the output shaft and the first flywheel device when the output shaft does not rotate.

14. The wave energy harnessing device of claim 10, further comprising an energy storage/generator device operatively coupled to a first flywheel device of the wave energy harnessing device, the energy storage/generator device configured to convert rotational energy from the first flywheel device into electrical energy.

15. The wave energy harnessing device of claim 10, wherein the float gear is coupled to an input gear, the float gear being four to six times larger in diameter than the input gear.

16. The wave energy harnessing device of claim 15, wherein the input gear, the first one-way gear, the second one-way gear of a first gear assembly of the pair of gear assemblies, and the float gear of a second gear assembly of the pair of gear assemblies are coaxially arranged on the input shaft of the first gear assembly.

17. The wave energy harnessing device of claim 10 further comprising a first flywheel device operatively connected to the output shaft and a second flywheel operatively connected to the output shaft, wherein the first flywheel device is disposed on a first axial end of the output shaft and the second flywheel is disposed on a second axial end of the output shaft opposite the first axial end.

18. A method of harnessing wave energy in a water body comprising:
translating a first movable device in either a first direction or a second direction in response to a water level change;
rotating a first gear in response to translation of the first movable device, rotating a first input shaft in response to rotation of the first gear;
operatively coupling the first input shaft to an output shaft by a first one-way clutch in response to rotation of the first input shaft;
translating a second movable device in either the first direction or the second direction in response to the water level change;
rotating a second gear in response to translation of the second movable device;
rotating a second input shaft in response to rotation of the second gear; and operatively coupling the second input shaft to the output shaft by a second one-way clutch in response to rotation of the output shaft, wherein translation of the first movable device and the second movable device in either the first direction or the second direction results in rotation of the output shaft restricted to the first direction.

19. The method of claim 18, further comprising:

operatively coupling the output shaft to a first flywheel device;

operatively coupling a third one-way clutch to the first input shaft and the output shaft;

and operatively coupling a fourth one-way clutch to the second input shaft and the output shaft, wherein:

the first one-way clutch operatively couples the first input shaft to the output shaft in response to the first gear rotating in the first direction, the third one-way clutch operatively couples the first input shaft to the output shaft in response to the first gear rotating in the second direction, the second one-way clutch operatively couples the second input shaft to the output shaft in response to the second gear rotating in the first direction, and the fourth one-way clutch operatively couples the second input shaft to the output shaft in response to the second gear rotating in the second direction.

20. The method of claim 18, further comprising operatively driving the output shaft by the first input shaft and the second input shaft simultaneously when both the first movable device and the second movable device translate in either the first direction or the second direction.

\* \* \* \* \*